United States Patent
Finn

[11] Patent Number: 5,204,263
[45] Date of Patent: Apr. 20, 1993

[54] CHANNEL COVER

[75] Inventor: Larry J. Finn, Gladewater, Tex.

[73] Assignee: Bedminster Bioconversion Corporation, Cherry Hill, N.J.

[21] Appl. No.: 766,829

[22] Filed: Sep. 27, 1991

[51] Int. Cl.[5] .......................... C12M 1/06; C12M 1/02
[52] U.S. Cl. .................................. 435/315; 435/287; 435/316; 422/184; 71/9; 71/12; 71/14
[58] Field of Search ............... 435/287, 313, 315, 316; 422/184; 160/188, 201; 71/9, 12, 14; 366/345, 346

[56] References Cited

U.S. PATENT DOCUMENTS

| | | | |
|---|---|---|---|
| 3,138,447 | 6/1964 | Eweson | 71/14 |
| 3,245,759 | 4/1966 | Eweson | 435/312 |
| 3,451,799 | 6/1969 | Brown | 71/14 |
| 4,139,640 | 2/1979 | Kipp, Jr. | 71/9 |
| 4,384,877 | 5/1983 | Nemetz | 422/184 |
| 4,410,348 | 10/1983 | Ito et al. | 422/184 |
| 4,628,646 | 12/1986 | Eyerle | 160/201 |
| 4,793,397 | 12/1988 | Whiteman | 160/201 |
| 4,828,399 | 5/1989 | Pacentino et al. | 71/9 |
| 4,869,877 | 9/1989 | Sellew et al. | 422/184 |
| 5,049,486 | 9/1991 | Blackwood et al. | 422/184 |
| 5,076,827 | 12/1991 | Johnson | 71/9 |
| 5,095,965 | 3/1992 | Higashiyama | 160/201 |

*Primary Examiner*—Robert J. Warden
*Assistant Examiner*—Theresa A. Trembley
*Attorney, Agent, or Firm*—Stanley H. Zeyher

[57] ABSTRACT

A compost curing air circulating and odor control system including a channel for storage of compost to be cured, the channel being provided with a retractable cover to permit periodic turning of the compost within the channel while concomitantly maintaining the channel as a closed vessel and an air circulating system for venting air from the closed vessel and recirculating the air through the stored compost whereby to enhance pathogen destruction through improved control of temperature gradients within the compost pile and to improve odor control.

18 Claims, 5 Drawing Sheets

PRESENT INVENTION

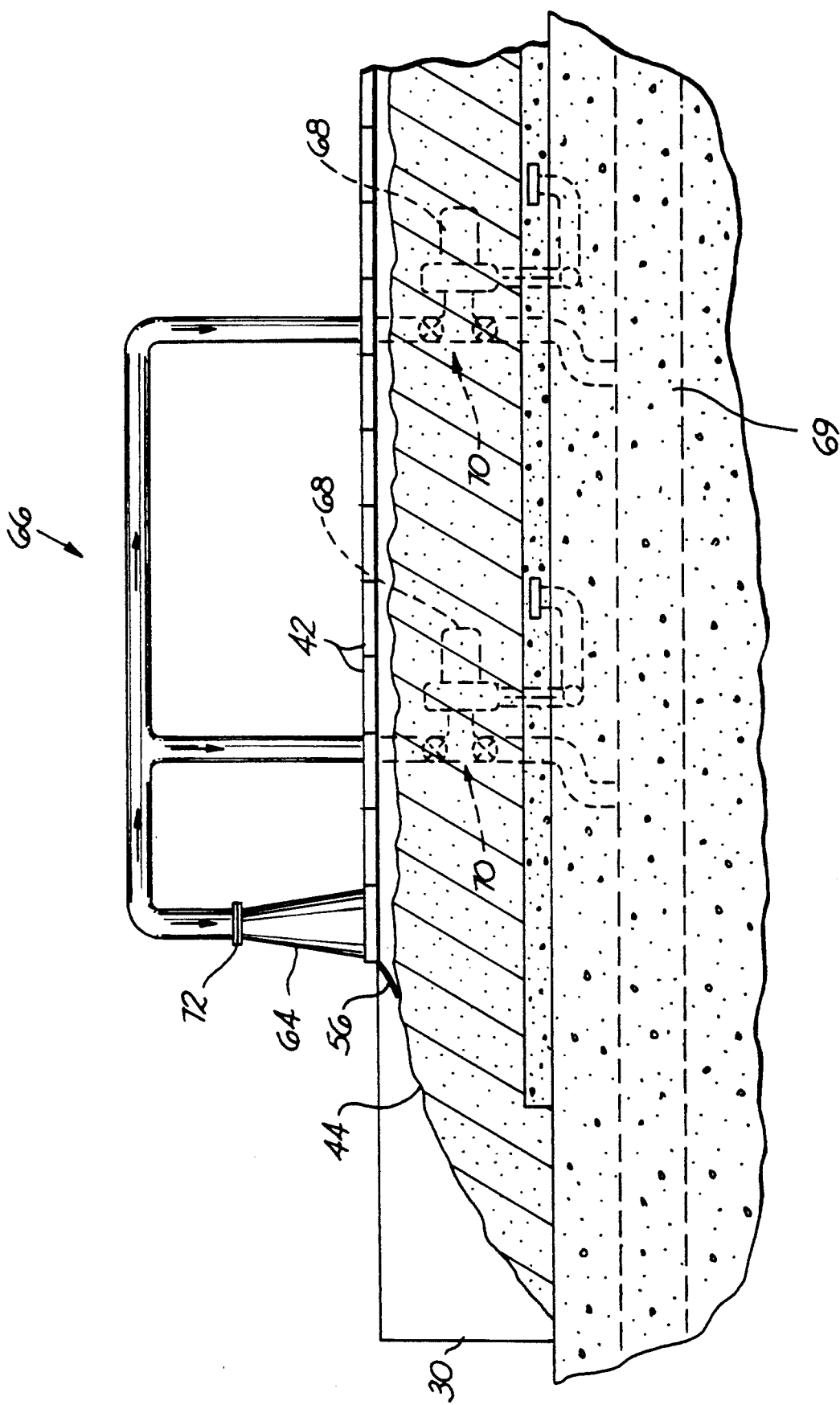

CHANNEL COVER

FIELD OF THE INVENTION

This invention relates broadly to apparatus for making organic fertilizer from organic waste material, sometimes referred to as compost, and more particularly to an improved compost curing system for use in connection with such apparatus.

BACKGROUND OF THE INVENTION

Prior art systems for achieving composting of solid waste and sewage sludge typically employ one or more multi-stage digesters in which material being treated undergoes staged microbial decomposition. The conventional digester is divided into two or more compartments or stages and during material processing is rotated while air is circulated through the digester at controlled rates under predetermined conditions in a flow direction counter to the material flow. The climate in each stage is maintained to achieve the optimum development of the type and species of microorganism predominant in that stage. Spent air is vented from the digester to the atmosphere as needed to maintain optimum climatic conditions in each of the operating stages. Temperatures are kept below 150 degrees F. to ensure the maximum rate of composting. Typical of such prior art systems and methodology of operation are those set out and described in U.S. Pat. Nos. 3,245,759 and 3,138,447 assigned to the assignee of the present invention, the teachings of which are hereby incorporated by reference.

The method and apparatus for manufacture of compost described in those patents is designed to produce aerobic decomposition of organic waste materials by maintaining within the apparatus in which the method is carried out, conditions suitable for optimum propagation of the different types of aerobic bacteria on which such decomposition depends. The apparatus comprises a digester in the form of a cylindrical drum mounted for rotation on an axis which is slightly declined towards the discharge end relative to the horizontal. The interior of the digester is divided into a series of compartments or chambers by a plurality of transverse partitions spaced along the axis of rotation. Each partition is provided with transfer buckets which are selectibly opened and which when opened, transfer material from compartment to compartment from the higher to the lower end of the drum, the raw waste organic material being fed into the digester at the higher end and partially cured compost being withdrawn at the lower end.

The co-composting technology to which the present invention has particular application embodies a fermentation reactor which is employed to accelerate the microbial conversion of solid waste and sewage sludge into a high quality compost. The process has the ability to compost municipal solid waste and sewage together hence the term co-composting, thereby addressing the two principal waste management problems communities will face in the next few decades. An important step in the overall composting process is the curing of the compost to reduce pathogens. During this critical stage it is important that the temperature of the compost be maintained at a fairly precise level for the entire period designated by the U.S. Environmental Protection Agency guidelines in order to achieve the prescribed pathogen destruction. Should external ambient air be used in a cold climate, for example, without prior heating and the concomitant expenditure of energy, the time to achieve the correct temperatures for the process would be extended and more of the microbes which are essential to carrying out the process could be damaged prior to reaching the proper temperature level. It further should be noted that one system of compost curing currently utilized employs open channels having concrete walls spaced eight to ten feet apart adapted to store compost within the channel six to eight feet high. In systems of this general construction the required pathogen reduction can only be achieved at the center of the mass. Temperatures at the upper surfaces and at the walls are many degrees cooler because of no insulation on the top surface.

I have discovered that by closing the heretofore open curing channels by employing a sliding insulated cover over the channel which can easily be rolled out of the way to allow mechanized or manual turning of selected portions of the compost pile, and then quickly returned to its heat insulating position, that improved temperature control within the channel can be achieved with concomitant improved pathogen destruction.

I have also discovered that by providing a closed air circulating system for use in conjunction with the insulated cover that pathogen destruction is further enhanced along with improved odor control. Typical prior art channel composting systems use ambient building air to aerate the compost pile. This causes undue cooling of compost in the bottom of the pile as the air is circulated through the pile thus jeopardizing the attainment of sufficient temperatures to ensure pathogen destruction throughout the pile.

In conjunction with the sliding insulated cover which in effect converts the open channel into a closed vessel, I employ a system of duct work which can be used to capture spent air from the top of the enclosed area of the channel thereby retaining the heat generated within the pile to achieve much better temperature regulation while at the same time releasing less spent air to the building atmosphere where odor removal is often necessary.

The above described system results in achievement of pathogen destruction in accordance with EPA regulations pertaining to closed vessels thereby materially improving the overall operating efficiency of the composting system which heretofore required a much longer compost residence time within the open channels in order to meet EPA standards.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 6 is a sideview of the sliding channel cover in combination with a recirculating air system.

DETAILED DESCRIPTION OF THE INVENTION

Figure 1:
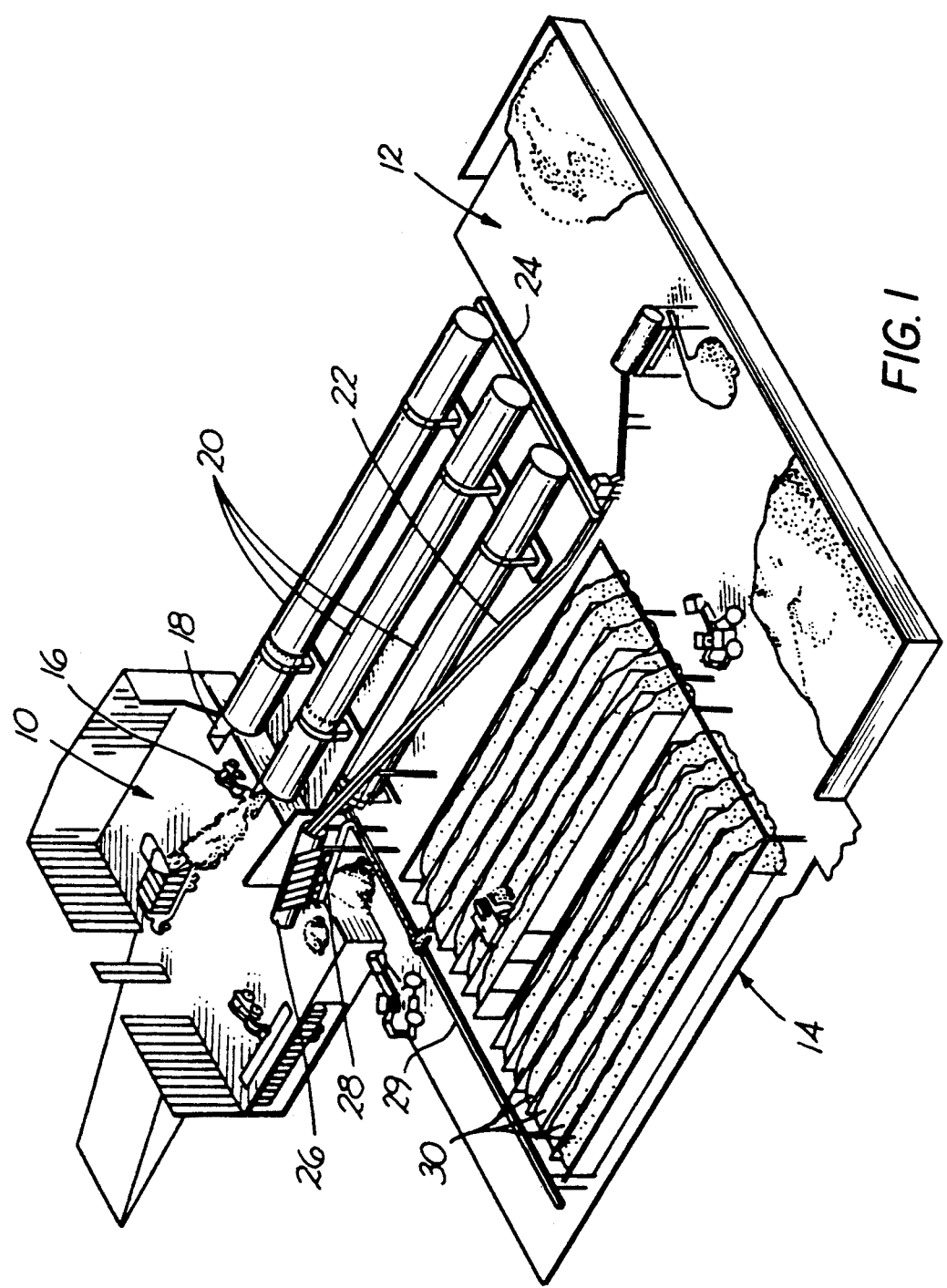
FIG. 1 is an isometric overview of a composting facility depicting the prior art open channel curing system.

Referring now to the drawings and more particularly to FIG. 1 thereof, there is shown a composting facility comprised of three major areas, the tipping area 10, a processing area 12, and an aeration or curing area 14. The tipping area floor is where the solid waste is dumped and sorted. Unacceptable waste, for example, white goods, car batteries, tires, large pieces of wood, etc., is rejected and sent to a landfill. The acceptable waste is then moved by means of an end loader 16 from the tipping floor into ram pits 18 positioned at the entry of digesters 20. Waste is loaded directly into the digester drum by means of an hydraulic loading ram. Sewage sludge delivered to the plant is stored in a liquid sludge tank from where it is pumped by liquid sludge pumps directly into the digesters 20 as needed to maintain the proper carbon/nitrogen ratio essential to efficient composting.

The material is processed through the digester for a period of three days. The digester is typically divided into three fermentation chambers or stages by means of internal partitions. Material is discharged from the digester after approximately three days of residence time. Upon removal from the digester the material, now compost plus non-degradables, is transported by belt conveyors 22 and 24 to a trommel screen 26 where it is rough screened into two fractions. One is the residue, which fails to pass through the screen. This residue is discharged back onto the tipping floor by belt conveyor 28 from where it is pushed into a transfer trailer for landfill disposal. The second fraction is rough compost, sometimes hereinafter referred to as organic or degradable material. This material is conveyed to the curing area 14 by belt 29. It is the curing area to which the present invention is directed. As seen in FIG. 1 the curing area 14 is comprised of a series of curing channels 30 of generally U-shaped configuration. Each of the channels is approximately 10 foot wide bounded by reinforced cement walls approximately 8" thick and 7 to 8 feet high. The channels are of varying length depending on the particular application. Each channel is loaded with compost to be cured. The compost is turned daily by manual or mechanized means.

Typically, prior art compost curing, as illustrated in FIG. 1, is carried out in open channels 30. The curing process utilizing such a system requires 10-14 days of residence time in combination with continual mixing and positive aeration to achieve the desired pathogen destruction. Compost must remain in the vessel long enough so that it reaches a temperature of 55 degrees C. for a period of time required to achieve the pathogen kill prescribed by the EPA. The present invention converts the open channel system of the prior art to a closed vessel system by the expedient of utilizing a sliding insulating cover over each of the curing channels during this critical phase of the process.

As noted above to achieve the requisite pathogen kill as stipulated by EPA regulations, it is necessary in the case of an open channel that the compost be maintained as a minimum at 55 degrees C. for from 10-14 consecutive days with a minimum of five turnings during that period. The minimum requirements to render the compost product pathogen-free for an in-vessel curing requires the compost to be maintained at 55 degrees C. throughout the mixture for a period of only three consecutive days.

By providing a sliding insulated cover over the channel opening which can easily be rolled out of the way to allow for turning of the compost and that can automatically be returned to its home position after turning of the compost, the attributes of a closed system can be readily achieved. The cover can be made up of a number of hinged segments so that it can be rolled up and stored out of the way as the turning mechanism advances. Turning of the compost can be achieved manually although it is preferable to use some form of mechanized operation. It will thus be seen that practice of the present invention results in substantial reduction in processing time thereby improving operating efficiency and reducing the overall cost of the composting process.

Figure 2:
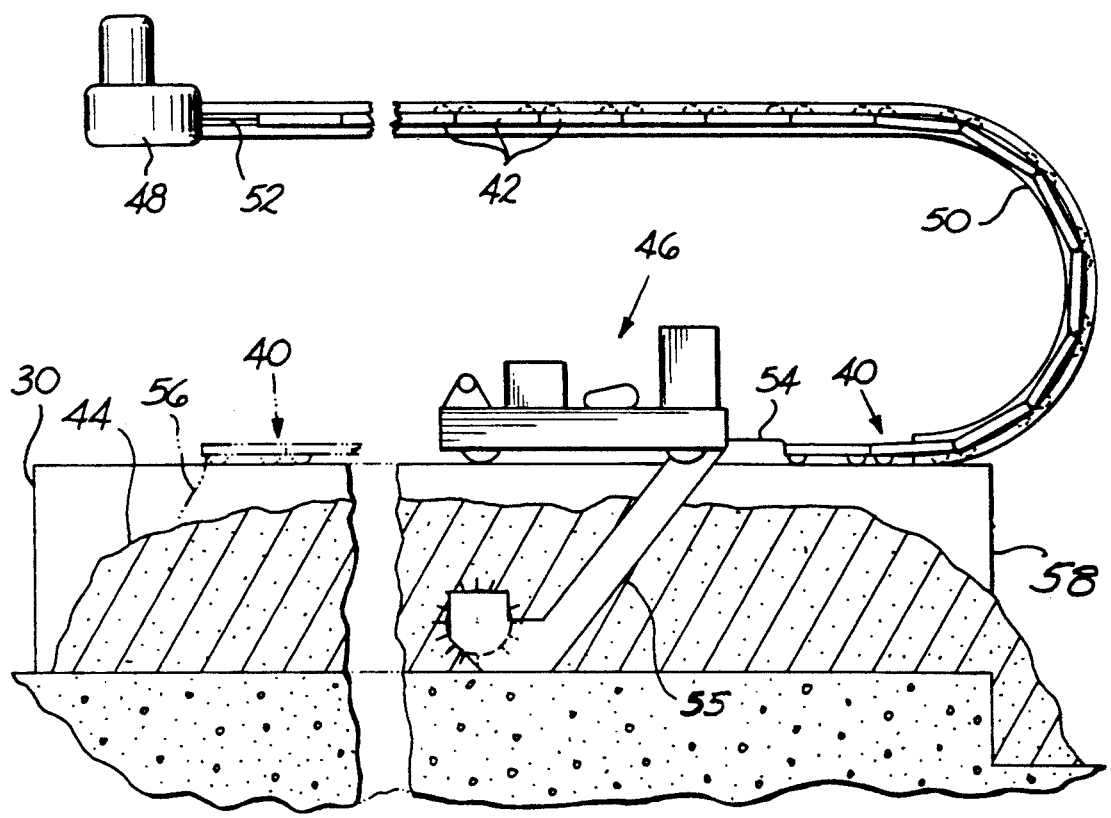
FIG. 2 is a side view of the dynamic channel sliding cover system comprising one aspect of the present invention showing the cover in its home and fully retracted positions.
Figure 3:
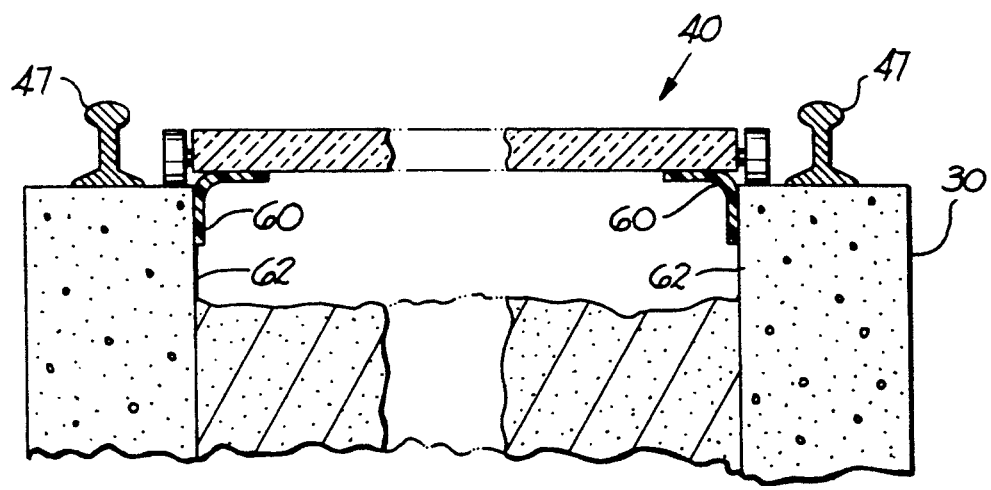
FIG. 3 is a cross sectional view of a modified form of sliding channel cover.

As graphically illustrated in FIGS. 2 and 3 through use of an insulating cover the heretofore open curing channel is converted to a closed in-vessel curing system having the advantages noted above.

Figure 5:
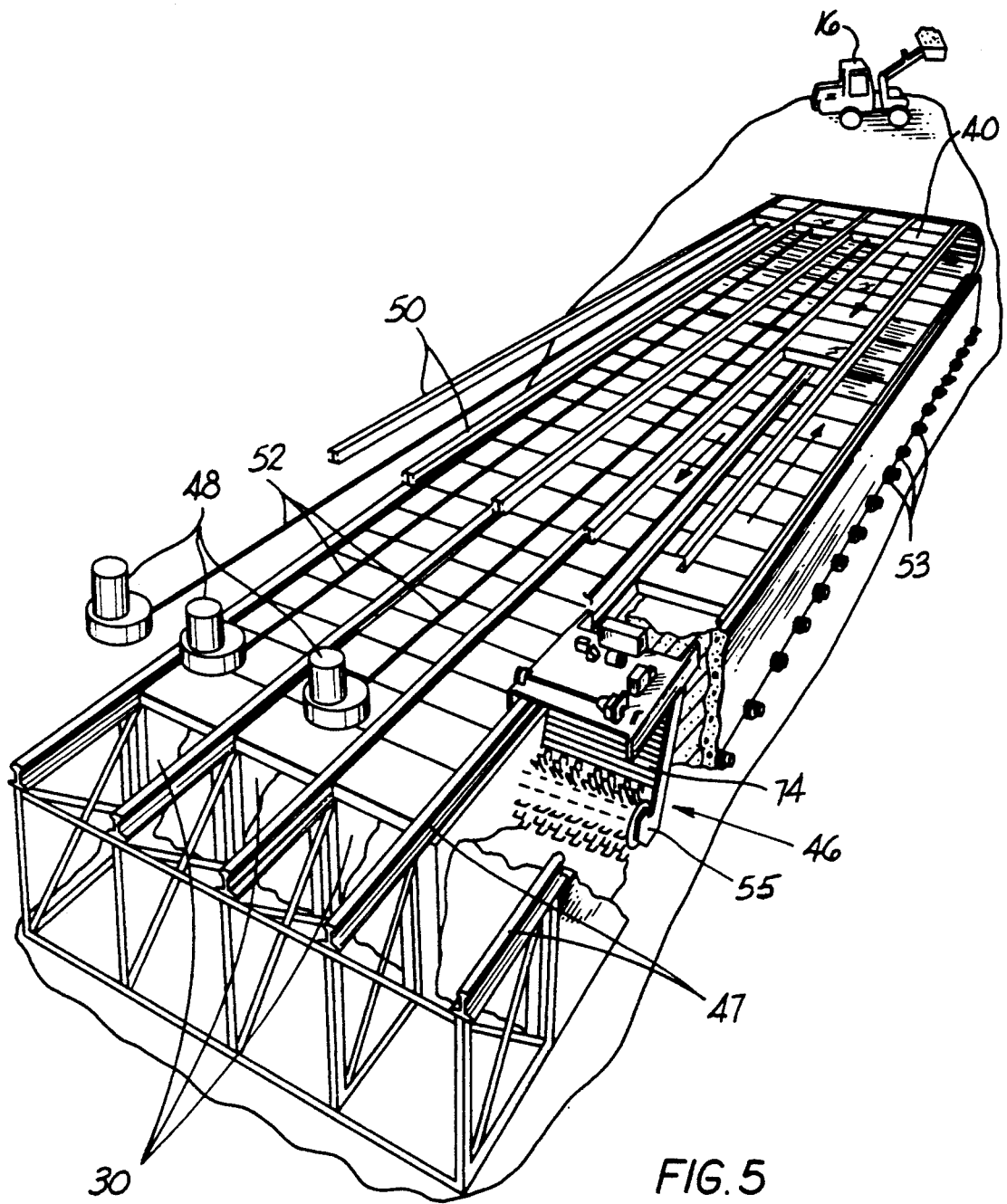
FIG. 5 is a partially cutaway isometric view of a dynamic channel system showing the inneraction of the turning machine and channel cover.

A preferred construction of the panel 40, as seen in FIG. 2, is to use a series of hinged segments 42. As seen in FIG. 2 and compost 44 stored within the covered channels 30 is mixed and turned periodically by means of a compost turning machine 46 riding on rails 47 mounted on top of the channel walls. As seen in FIG. 5, as the machine advances along the channel the cover is moved ahead of the machine, either by the machine itself of by a variable speed reversible motor 48, as seen in FIG. 2, causing the articulated cover to roll up on track 50. The motor 48 is coupled to the panel 40 by means of chain drive 52 connected to an end panel through linkage not shown. The mechanism for this arrangement is much the same as that used in the opening and storage of an overhead garage door.

When the turning machine 46 has traversed the length of a channel it moves onto a transfer dolly (not shown) which positions it for movement along the next adjacent channel. Since mixing begins at the unloading zone of the channel, to position the machine on the next channel the mixing arm 55 of the machine is raised above the compost pile within the channel and the turning machine is moved rapidly to the unloading zone of the next channel to start a new cycle. As seen in FIG. 2, as the machine moves back along an adjacent channel, arm 54 carried by the machine engages the rear most end of cover 40 and returns it to its home or starting position. Repositioning of the cover over the channel in which the compost has just been turned can also be achieved through use of reversible motor 48. This action insures that immediately upon completion of the turning of the compost within a given channel that channel is maintained as a closed vessel. It should also be understood that as the compost pile is undergoing turning the only portion of the pile which remains uncovered is that part which is undergoing, or which has just undergone, treatment. All other portions of the compost pile within that channel and all other channels awaiting treatment are in a completely covered condition. Complete covering of the compost pile during turning is achieved through use of a depending curtain 56 hung at the front end of the cover which drags across the surface of the compost pile during movement of the cover and which acts in cooperation with a fixed curtain mounted at the other end of the channel to insulate the compost pile from the outside air. The cover also incorporates a depending edge element 60 as shown in FIG. 3. These edge elements, which typically are made of resilient rubber, engage upper inner wall portions 62 of the channel and serve both to seal the channel from the outside air and to provide a guide for the movement of the cover along the channel.

Temperature conditions within the channel are monitored by thermocouples carried within the channel walls. Temperature is maintained within prescribed limits by means of the novel air circulation system shown in FIG. 6. The heat source for the curing process is that derived from the exothermic reaction of the biochemical process. As seen in FIG. 6, the cover is provided with a spout or funnel 64 which in cooperation with a system of duct work 66 is used to vent spent air from the top of the enclosed area of the channel. The exothermically heated air is drawn from the compost pile by blowers 68 mounted on the outer wall of the channel. The air drawn from the channel is mixed with external fresh air flowing through duct 69, as required to maintain the desired temperature gradients within the compost pile. A mixing valve 70 may be computer operated or be placed under the manual control of an operator to achieve the desired temperatures.

The air circulating system is in a fixed location over each channel and is brought into communication with the air funnel or spout 64 carried by the cover by means of a connecting gland 72 provided on the funnel.

Figure 4A:
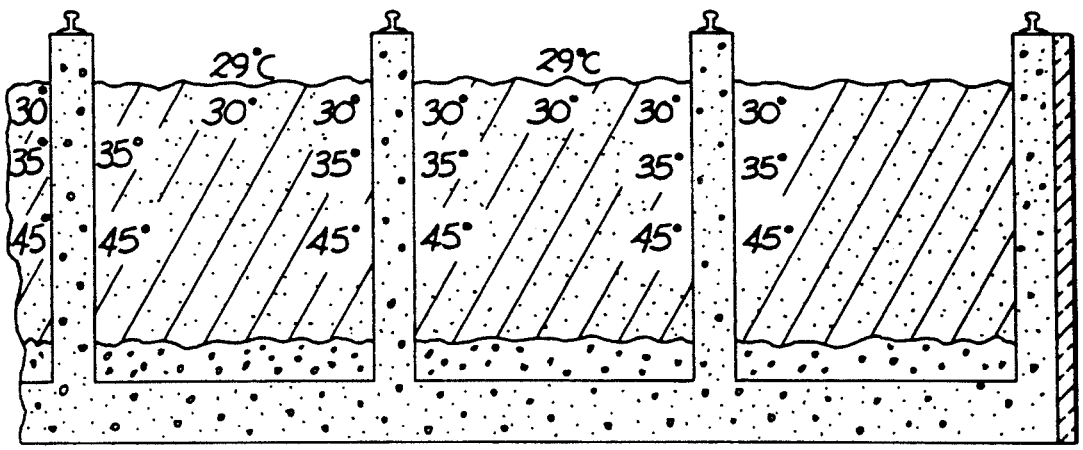
FIG. 4 is a graphic illustration of temperature profiles within the compost pile contrasting the prior art with that obtainable using the present invention.
Figure 4B:
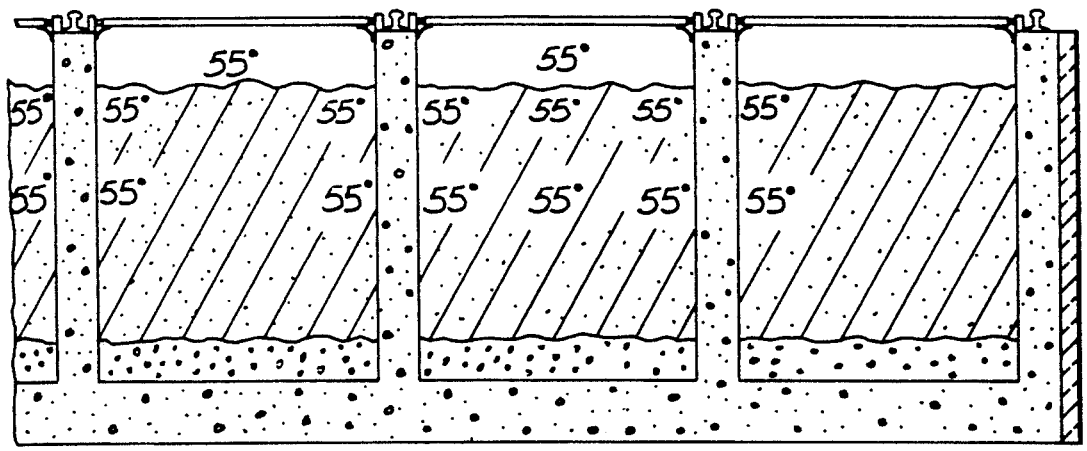

The temperature stabilization achieved through use of the present invention is graphically illustrated in FIGS. 4A and 4B. These figures depict the temperature gradients normally obtaining in a prior art channel as contrasted with that achieved through use of the present invention.

A typical mechanism for turning compost stored within a channel is shown in FIG. 5. The turning machine employs an inclined drag conveyor 74 which acts thoroughly to turn and mix the compost as the machine moves along the channel. During each transverse of a channel the compost pile is moved between 10 and 12 feet. At the end of each traverse the turning machine is moved onto an automatic transfer dolly (not shown) which positions it at the next channel to repeat the cycle. The length of each channel is determined by the workload of a particular application. Turning machines such as briefly described above are well known in the prior art. As the machine advances, the insulating panel is either pushed by the machine up tracks 50 or is pulled up the tracks by a variable speed reversible motor 48.

In this latter event movement of the cover is synchronized with movement of the turning machine. The motor when driven in one direction rotates a chain drive 52 to which one end of the panel is secured. This acts to pull the insulating panel up track 50. When driven in the opposite direction of rotation the insulating panel is repositioned over the channel. Positive aeration of compost within the channels is achieved through use of blowers.

As seen in FIG. 2 as the cover 40 advances along the channel 30 it is stored in the overhead track much like that used in housing an overhead garage door. This storage arrangement is best seen in FIGS. 2 and 5. Alternative arrangements for storage of the cover are to roll it up in a tight overhead coil or to provide for the cover to be stacked in an accordion-like fashion. The former of these two arrangements would require the articulated segments comprising the cover to be of shorter length to accommodate the sharper turning radius required for coiling the cover. It would of course be possible, particularly when using channels of short length to simply extend the cover directly off the end of the channel on suitable flat supports. This latter arrangement would allow for use of a flat unhinged slab of insulating material.

In summary, the use of a heat-insulating cover overlying the curing channels allows for greater control of the thermal gradients within the stored compost thereby materially improving pathogen destruction from both a qualitative standpoint and from the standpoint of the efficiency of operation. This procedure is additionally enhanced by the recirculating air system shown in FIG. 6 which both improves temperature and odor control.

Having described the present preferred embodiments of the invention with reference to the appended drawings, it should be understood by those skilled in the art that various changes in construction can be introduced without departing from the true spirit of the invention as defined in the appended claims.

I claim:

1. In a composting system, comprised of a channel storing compost to be cured, said channel being of generally U-shaped, cross-sectional configuration and having a floor, sidewalls and an upwardly presented open face, the improvement comprising: a temperature-insulating cover overlying and closing the open face of the channel, turning means for periodically turning compost stored within the channel; and means for moving said temperature-insulating cover in advance of said turning means as it moves along the channel.

2. The system set forth in claim 1, including means depending from a front portion of said temperature-insulating cover contacting surface portions of the stored compost as said turning means advances along the channel whereby to maintain the stored compost insulated from the outside air.

3. The system set forth in claim 2, including temperature-insulating means at one end of the channel which in association with said depending means and temperature-insulating cover act to enclose and insulate the stored compost from the outside air.

4. The system set forth in claim 3, including air-venting means carried by said temperature-insulating cover for venting air from the enclosed area defined by said channel, said temperature-insulating cover and said depending and temperature-insulating means, and means for recirculating vented air through compost stored within the channel whereby to maintain predetermined temperature gradients within the stored compost and to enhance odor control.

5. The system set forth in claim 4, including means for mixing fresh outside air with air vented from the enclosed area for recirculation through the stored compost.

6. The system set forth in claim 4, comprising external air circulating means in a fixed location relative to said temperature-insulating cover.

7. The system set forth in claim 6, wherein said external air circulating means comprises a system of ductwork and associated blowers.

8. The system set forth in claim 4, including means for connecting said air venting means carried by said temperature-insulating cover with said vented air recirculating means when said temperature-insulating cover is in its starting position.

9. The system set forth in claim 3, wherein said means for moving said temperature-insulating cover comprises said turning means and associated linkage.

10. The system set forth in claim 1, wherein said means for moving said temperature-insulating cover comprises a reversible motor mechanically linked to said temperature-insulating cover.

11. The system set forth in claim 10, wherein said temperature-insulating cover comprises a series of articulated segments.

12. The system set forth in claim 11, comprising means for storing said temperature-insulating cover away from said channel as said temperature-insulating cover is moved in advance of said turning means.

13. The system set forth in claim 12, wherein said storage means comprises overhead tracks for temporary retention of said temperature-insulating cover.

14. The system set forth in claim 1, wherein said temperature-insulating cover is provided along its longitudinal edges with depending elements which engage innermost side wall portions of the channel whereby to seal the channel from the outside air and to provide a guide for the movement of said temperature-insulating cover along the channel.

15. The system set forth in claim 1 wherein said temperature-insulating cover comprises a slab of temperature-insulating material.

16. The system set forth in claim 15, wherein said slab is provided with a series of wheels disposed along its outer edges to ride along the channel side walls to facilitate longitudinal movement of the slab along the channel.

17. The system set forth in claim 16, wherein said slab is comprised of a series of hinged segments.

18. The system set forth in claim 16, including track means mounted on the channel side walls to guide the movement of said series of wheels along the channel.

* * * * *